(No Model.)

2 Sheets—Sheet 1.

H. P. GARLAND.
WHEEL.

No. 526,622.

Patented Sept. 25, 1894.

WITNESSES
Edw. S. Duvall Jr.
Wm. L. Boyden

INVENTOR
Howard P. Garland
per Fred E. Tasker.
Attorney (No Model.) 2 Sheets—Sheet 2.
H. P. GARLAND.
WHEEL.
No. 526,622. Patented Sept. 25, 1894.
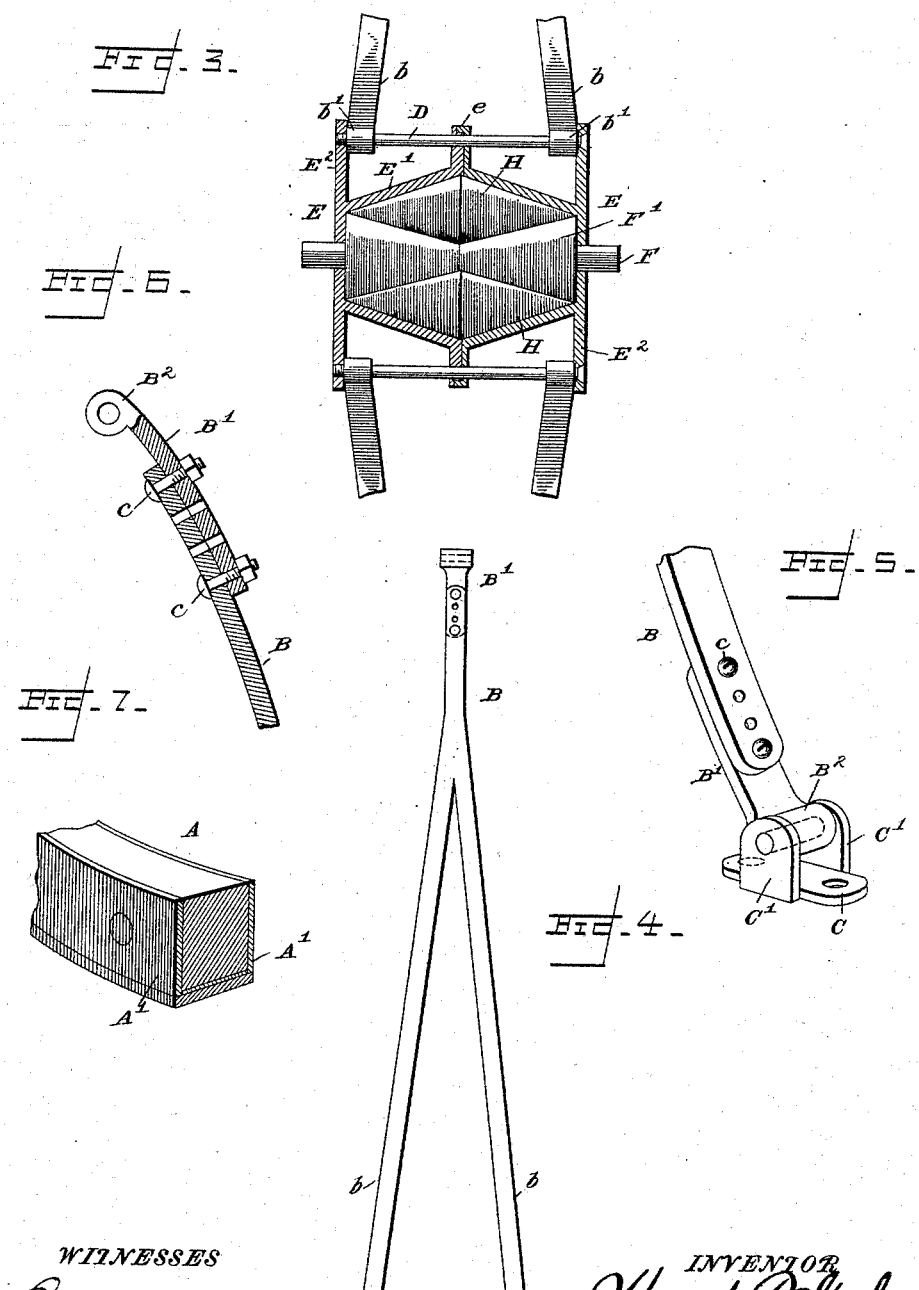
WITNESSES
Edw. S. Duvall Jr.
Wm. L. Boyden
INVENTOR
Howard P. Garland
per Fred E. Tasker
Attorney

UNITED STATES PATENT OFFICE.

HOWARD PRATT GARLAND, OF PETALUMA, CALIFORNIA.

WHEEL.

SPECIFICATION forming part of Letters Patent No. 526,622, dated September 25, 1894.

Application filed December 27, 1893. Serial No. 494,889. (No model.)

*To all whom it may concern:*

Be it known that I, HOWARD PRATT GARLAND, a citizen of the United States, residing at Petaluma, in the county of Sonoma and State of California, have invented certain new and useful Improvements in Wheels; and I do hereby declare the following to be a full, clear, and exact description of the invention, such as will enable others skilled in the art to which it appertains to make and use the same.

This invention refers to an improvement in wheels adapted for use for various purposes, but more especially intended for bicycles, tricycles, and similar light machines, the object being to improve wheels of the class having resilient or spring spokes in order to increase their practicability and insure their wider adoption and more general use, and the invention therefore consists in the construction, arrangement and combination of parts, substantially as will be hereinafter described and claimed.

Figure 1:
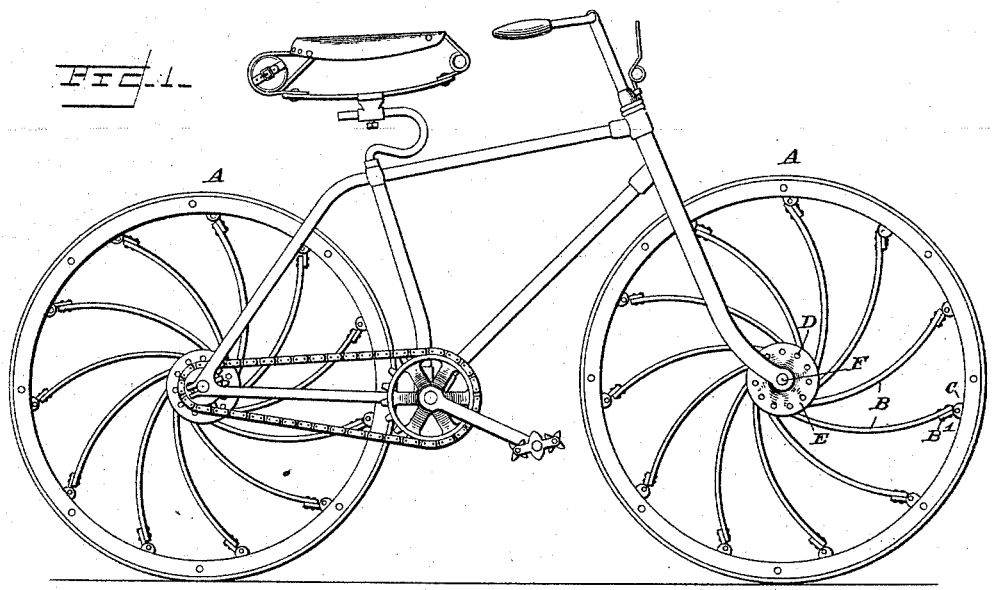
Figure 2:
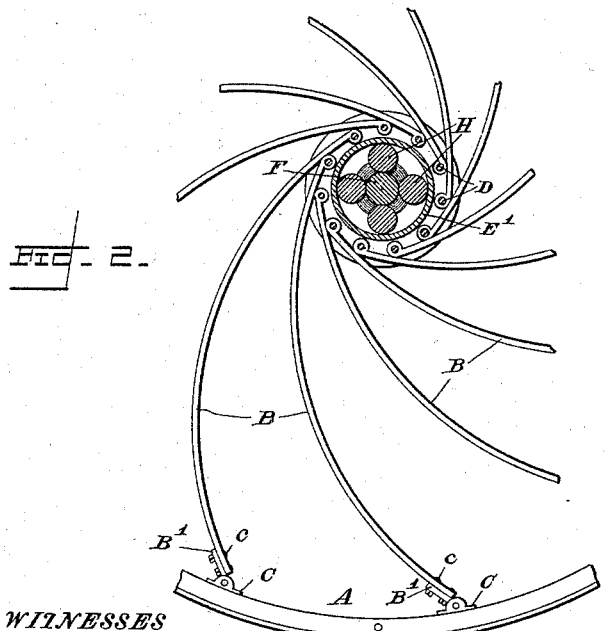

In the annexed drawings illustrating my invention: Figure 1 is a side elevation of a bicycle provided with my improved spring wheel. Fig. 2 is an enlarged detail view showing the arrangement of the spokes with the hub which is shown in section. Fig. 3 is an enlarged sectional elevational view of the hub showing the interior construction thereof and the connection of the spokes thereto. Fig. 4 is a detail plan view of one of the spokes. Fig. 5 is a sectional view of the adjustable end of the spokes. Fig. 6 is a perspective view of the same and shows how it is attached to a clip on the rim. Fig. 7 is a detail section of the rim of the wheel.

Like letters of reference designate like parts throughout the several figures of the drawings.

A denotes the circular rim of the wheel. The felly of this rim is preferably of wood, say for instance, hickory, properly curved, and covered with rawhide which is placed green thereon and which dries and makes a very solid and tough combination, and then a couple of iron flanges A' are placed on each side of the felly and riveted through it and the rawhide so as to bind the whole firmly together. Any kind of tire may be used. Also this construction of rim may be changed considerably from what is herein specified without departing from my invention.

The spokes B are preferably made of the very best saw plate steel so that they will be strong and resilient. There may be as many of these spokes as desired in any given wheel. The form of the spoke is shown in Fig. 4 where the inner portion that is attached to the hub is split, cleft or forked to provide the arms $b$ $b$, having the terminal eyes or bearings $b'$ $b'$, while the outer end of the spoke is provided with an adjustable section $B'$ which is removable from spoke B and adjustable thereon so as to make the spoke longer or shorter to give greater or less elasticity or fit it for different uses and varying weights on the machine. The section $B'$ and spoke B are provided with coincident perforations fitted with bolts $c$ which permit of the relative adjustment of the two parts as shown. See Figs. 5 and 6. The section $B'$ has a socket or bearing $B^2$ in its outer end, that receives a spindle or journal supported in the sides $C'$ $C'$ of the clip C, which is securely affixed to the inner edge of the rim A. Thus each spoke has a pivoted connection with the rim and also a pivotal connection with the hub of the wheel. When the spoke is outside of the wheel, it will be straight and flat, as shown in Fig. 4, but when it is placed in normal and operative position, it will be curved as shown in Figs. 1 and 2, the amount of curvature depending on length of spoke, adjustment of same, size of wheel, &c.

The hub of my improved wheel possesses distinctive features of construction, different from other kinds. It is made in two parts E E, which are fitted together at the middle of the hub in a plane passing longitudinally through the center of the wheel. The meeting edges of the two parts have screw-threaded flanges which engage each other at $e$. See Fig. 3. These two parts E E are simply light metallic shells suitably shaped to contain the shaft and rollers within them and to provide a connection for the spokes, and hence their exact form may vary considerably. On the outer ends of the hub are flanges $E^2$ in which are held the horizontal pins or rods D, which pass through the eyes or bearings $b'$ in the ends of the spokes B and on which, therefore, the spokes are pivotally supported. A common form of hub may be used with the spring spokes if desired.

F denotes the shaft of the wheel. This is formed with a doubly-inclined or doubly-conical shape F' within the hub shells E E, said double cone having its part of smallest diameter at the middle of the shaft and its bases or ends abutting against the ends of the hub, as shown in Fig. 3. Arranged around this shaft is a series of four or more conical rollers H. These rollers are likewise doubly-conical, but the apex of each cone is at the end of the roller and hence the latter fits into the shaft, being inclined parallel thereto, as shown. The hub sections E E are shaped above and below the shaft F at E' E' to conform to the inclination of the rollers H. The inclination of rollers H may vary considerably. I reserve the liberty of changing their exact form as circumstances may require. It will be understood from what has been said that these rollers are anti-friction rollers and that they lie closely between the hub and the shaft and provide a bearing which operates easily and with but very little friction.

Having thus described my invention, what I claim as new, and desire to secure by Letters Patent, is—

1. In a wheel, the extensible spokes of spring metal, curved in form and pivotally supported at each end, said spokes consisting of two parts adjustable upon each other.

2. In a wheel, the combination of a flanged hub, the bifurcated spoke, pivotally attached to said hub, said spokes being made in two pieces attached to each other and the rim having clips on its inner edge to which the outer ends of the spokes are pivotally attached, substantially as described.

3. In a wheel, a spring spoke pivoted to the hub and provided with an adjustable section which is pivoted to the rim, said section being attached to the spoke proper by means of removable bolts, substantially as described.

4. The combination with the hub, of the spokes B having prongs $b\ b$ terminating in sockets $b'$, and the adjustable spoke section B' bolted or otherwise secured to the spoke B and rim to which the section B' is movably attached, substantially as described.

5. In a wheel, the spoke B, having prongs $b\ b$ terminating in eyes $b'$ and the adjustable section B' having the end socket $B^2$, said section B' being secured to the spoke B by means of bolts $c$, substantially as described.

In testimony whereof I affix my signature in presence of two witnesses.

HOWARD PRATT GARLAND.

Witnesses:
H. P. BRAINERD,
J. L. DINWIDDIE.